United States Patent
Zhu et al.

(10) Patent No.: US 9,006,362 B2
(45) Date of Patent: Apr. 14, 2015

(54) CONTROLLED RADICAL POLYMERIZATION OF (METH)ACRYLATE MONOMERS

(71) Applicant: Henkel Corporation, Rocky Hill, CT (US)

(72) Inventors: Qinyan Zhu, Cheshire, CT (US); David P. Dworak, East Hartford, CT (US); John G. Woods, Farmington, CT (US); Anthony F. Jacobine, Meriden, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 42 days.

(21) Appl. No.: 13/795,537

(22) Filed: Mar. 12, 2013

(65) Prior Publication Data

US 2014/0107283 A1  Apr. 17, 2014

Related U.S. Application Data

(60) Provisional application No. 61/714,537, filed on Oct. 16, 2012.

(51) Int. Cl.

| | |
|---|---|
| *C08F 20/18* | (2006.01) |
| *C08F 20/14* | (2006.01) |
| *C08F 2/38* | (2006.01) |
| *C08F 4/00* | (2006.01) |
| *C08F 4/06* | (2006.01) |
| *C08F 220/18* | (2006.01) |
| *C08F 220/14* | (2006.01) |
| *C08F 220/20* | (2006.01) |
| *C08F 220/26* | (2006.01) |

(52) U.S. Cl.
CPC ................. *C08F 20/18* (2013.01); *C08F 20/14* (2013.01); *C08F 2/38* (2013.01); *C08F 4/00* (2013.01); *C08F 4/06* (2013.01); *C08F 220/14* (2013.01); *C08F 220/18* (2013.01); *C08F 220/20* (2013.01); *C08F 220/26* (2013.01); *C08F 2438/01* (2013.01)

(58) Field of Classification Search
USPC ....................................... 526/95, 98, 108, 217
See application file for complete search history.

(56) References Cited

U.S. PATENT DOCUMENTS

| | | |
|---|---|---|
| 8,802,785 B2 | 8/2014 | Kautz et al. |
| 2003/0018151 A1 | 1/2003 | White et al. |
| 2011/0060157 A1* | 3/2011 | Glaser et al. .................. 560/180 |
| 2011/0065875 A1* | 3/2011 | Matyjaszewski et al. .... 526/146 |
| 2011/0082230 A1 | 4/2011 | Jakubowski et al. |
| 2011/0136963 A1 | 6/2011 | Couvreur |
| 2013/0085242 A1* | 4/2013 | Hesse et al. ................... 526/108 |

FOREIGN PATENT DOCUMENTS

| | | |
|---|---|---|
| WO | 0230996 A2 | 4/2002 |
| WO | 2009155303 A2 | 12/2009 |

OTHER PUBLICATIONS

International Search Report for PCT/US2013/063979, 3 pages.

* cited by examiner

*Primary Examiner* — Vu A Nguyen
(74) *Attorney, Agent, or Firm* — Steven C. Bauman (57) ABSTRACT

Living radical polymerization processes, reaction products of such processes, and compositions containing such reaction products are provided. More particularly, a living radical polymerization of (meth)acrylic acid monomers employing having a defined order of introduction of the reactants and/or a specific set of reaction conditions, is provided.

21 Claims, 3 Drawing Sheets

CONTROLLED RADICAL POLYMERIZATION OF (METH)ACRYLATE MONOMERS

BACKGROUND

1. Field

The present invention relates to controlled radical polymerization processes, reaction products of such processes, and compositions containing such reaction products. More particularly, the invention relates to a process of controlled radical polymerization of acrylic and/or methacrylic acid monomers employing a defined order of introduction of the reactants, and/or a specific set of reaction conditions.

2. Brief Description of Related Technology

Demand for increasingly efficient ways to produce polymers continues. Controlled radical polymerization ("CRP"), including single-electron transfer living radical polymerization ("SET-LRP") and atom transfer living polymerization ("ATRP"), is a process which produces various polymer products, in high yield, with functional, non-terminated ends, with high molecular weights, and with a low polydispersity index. Thus, CRP has been employed to design a variety of polymer products. However, these CRP processes typically require the use of solvents that are toxic and/or are difficult to remove from the final products. This creates concerns about the safety and purity of the polymers.

Previous CRP polymers have shear modulus values which are less than desirable for many applications. Moreover, CRP polymers can be difficult to modify for use in applications requiring flexibility, thermal resistance, fluid resistance and other desirable physical and chemical properties. In particular, previous CRP polymers often have a broad molecular weight distribution indicating that the polymer produced is not actually a single polymer, but instead is a blend of numerous polymers. The physical properties of broadly distributed polymer blends are different from those of narrow distributions. The production of a blend of polymers can lead to inhomogeneity in polymer structures and difficulty in processing. For example, small amounts of high MW polymer chains disproportionally affect the viscosity and can be difficult to process.

Thus, there exists a need for a CRP polymer process that allows (a) better control of polymerization exotherm; (b) reduced viscosity of polymerization solutions; and (c) better yields of recycled solvents, increases the uniformity in structure and properties of the polymers produced, and does not employ toxic solvents that are difficult to remove from the final polymer product.

ATRP provides a method to build polymers. Typically, ATRP can be performed on a narrow range of monomers with a narrow range of initiators. Also, ATRP is typically catalyzed with a metal in the +1 (or $M^{+1}$), or other lower oxidation state, such as a Cu(I) salt catalyst. As the polymerization process is slow, high concentrations of the catalyst are needed to drive the reaction as are high temperatures which must be maintained for a prolonged period of time. Though functional ends are desirable for the final product polymer, an ATRP catalyst can be unstable and promote termination concomitant with formation of non-functionalized end groups.

Thus, ATRP generally gives material containing some non-functionalized polymer with unreactive end groups. As a result, a typical polymer produced by ATRP may contain in the region of 10-15% of the chain ends terminate to provide material with less desirable mechanical and material properties and characteristics. Both the molecular weight and the polydispersity index of the product diverge from theory by the premature termination of the polymer ends, which often results in poor rheological control and impracticability in various applications and uses. Thus, the lack of control of the ATRP process results in polymer products with structural defects, less desirable features, and less predictable characteristics. In addition, Cu(I) salts are unstable in air and require care in handling.

There exists a need for a method of controlled radical polymerization that allows for better control of the structure, composition, and properties of the polymer to be produced.

SUMMARY

A controlled radical polymerization process is provided, having the steps of: (i) providing a mixture containing: (a) one or more (meth)acrylate monomers; and (b) at least one amine ligand; (ii) feeding the mixture portion-wise at a defined flow-rate into a reaction vessel containing: a solvent; at least one halogenated initiator; and a metal catalyst, (iii) continuing to feed the mixture portion-wise into the vessel a polymerization of the monomer occurs, and (iv) permitting the reaction to proceed under conditions suitable to conduct controlled radical polymerization.

A polymer reaction product made from that process is also provided, where the polymer reaction product has a polydispersity of about 1.0 to about 1.8 The polymer reaction product is formed by a process having the steps of: (i) forming a premixture of one or more (meth)acrylate monomers and at least one tertiary amine ligand; (ii) combining the premixture with a solvent, at least one halogenated initiator, and a metal catalyst; and (iii) reacting the combination of step ii) under conditions suitable to conduct living radical polymerization.

An adhesive, sealant, or coating composition containing the polymer reaction product having a polydispersity of about 1.0 to about 1.8 and a free radical polymerization initiator is also provided. The polymer reaction product is formed by a process having the steps of: (i) forming a premixture of one or more acrylate monomers and at least one tertiary amine ligand; (ii) combining the premixture with a solvent, at least one halogenated initiator, and a metal catalyst; and (iii) reacting the combination of step ii) under conditions suitable to conduct living radical polymerization.

DETAILED DESCRIPTION

The processes produce polymers that exhibit improved properties use in pressure sensitive adhesives, hot-melt adhesives, structural adhesives and sealants, surface coatings, and toughening agents for thermosetting compounds. Moreover, the process of the present invention allows for improved production of block copolymers for controlled morphology.

In the processes of the present invention, ATPR or SET-LRP methods may be employed. However, the inventive processes include a precise order of addition of the reactants and/or a particular set of reaction conditions to yield polymers with improved uniformity of structure and properties. The methods of the present invention allow for greater control over the final polymer products such that the desired chain length, polydispersity, molecular weight, and functionality are easily controlled in the final product. Thus, the present invention extends additional control over molecular weight distribution, functionality, polymer rheology, and polydispersity.

Also, because this process is well controlled, it can be implemented on a large scale with a high predictability and/or used to tailor the properties of the final polymer products to new degrees, and products can be designed based on their properties. Further, because there is less termination, the structure and composition of the polymer are more precise and the end product has more desirable properties and characteristics to promote a better product. Further, as very low levels of catalyst are needed to drive the reaction and lower temperatures are used (allowing the use of less toxic and/or more volatile solvents) the purification of the final product is simplified, and at times, becomes unnecessary.

To achieve the desired result, in the process of the invention, a particular order for the mixture and order of combination are used. In the process of the present invention, the monomer and amine ligand are mixed. In a reaction vessel, the solvent, halogenated initiator, and metal catalyst are mixed. The monomer/amine ligand mixture is then added portion-wise at a defined flow-rate to the reaction vessel. The addition of the monomer/amine ligand mixture is continued into the reaction vessel under controlled radical polymerization reaction conditions. The portion-wise addition may be continuous (e.g., drop-wise) or intermittent (e.g., a portion added every 10 minutes) over a predetermined time. The polymer may then be isolated at the end of the addition or polymerization may be allowed to continue for an additional time.

Typically, the addition of the monomer/amine ligand is carried out over a period of about 0.5 to about 2.0 hours. In certain embodiments, the addition occurs over a period of about 30 minutes, about 35 minutes, about 40 minutes, about 50 minutes, about 60 minutes, about 85 minutes, or about 90 minutes.

Typically, the addition of the monomer/amine ligand is carried out at a flow-rate of about 0.2 to about 2.0 grams of amine ligand/minute. In certain embodiments, the addition occurs at a flow-rate of about 0.4 to about 1.5 grains of amine ligand/minute, about 0.6 to about 1.0 grams of amine ligand/minute, about 0.7 grains of amine ligand/minute, about 0.8 grams of amine ligand/minute, or about 0.9 grams of amine ligand/minute.

The reaction can then be continued over an additional period of up to about 72 hours. In certain embodiments, the reaction is continued for about 2.5 hours, about 3 hours, about 3.5 hours, about 4 hours, about 5 hours, about 6 hours, about 20 hours, about 22 hours, about 24 hours, about 48 hours, or about 68 hours.

In the processes of the present invention, the temperature at which polymerization is carried out is well controlled and typically lower than other methods of polymerization. Preferably, the temperature of polymerization is between about 0° C. and 80° C. For example, between about 23° C., i.e., about room temperature and 70° C. or between about 40° C. and 60° C. In addition, in embodiments of the invention, the temperature during addition may differ from the temperature during continued polymerization, and the temperature may be changed during these periods.

The process of the present invention typically results in the conversion of a majority of the monomer(s) into polymer. In certain embodiments, at least 60%, at least 70%, at least 80%, at least 90%, at least 95%, or at least 98% of the monomer is converted into polymer.

The processes of the present invention may be used to produce block copolymers or other copolymers (e.g., terpolymers). Examples of such copolymers are described in the Examples. In making these copolymers, two or more acrylate monomers are used. Each acrylate monomer may be added sequentially to the reaction vessel as part of its own monomer/amine ligand mixture or may be added together as part of a mixture of the two or more monomers and the amine ligand.

As used herein, the term "portion-wise" means that a reactant or mixture of reactants is added to a reaction mixture over a period of time. This in contrast to adding all of the reactant or mixture of reactants to a reaction mixture all at once. Portion-wise can be a continuous addition over the time period, such as addition drop-wise or in a continuous stream, or it can be intermittent, such as the addition of an aliquot periodically over the time period.

As used herein, the terms "halo" and "halogen" are intended to be synonymous, and both are intended to include elements commonly classified as "halogens", such as chlorine, fluorine, bromine, and iodine.

Desirable polymers from the inventive process have certain properties and characteristics. For example, the final polymer product should have a high thermal resistance for its use in various applications and fields of technology. Desirably, the final polymer product may be predictably produced to have high functionality on the ends of the polymer, a low polydispersity, and a molecular weight close to the theoretical molecular weight. While values and measurements of these features are provided in the Examples section herein, a brief discussion of each of the properties follows.

The degree of polymerization is the number average molecular weight divided by the weighted average molecular weight of all monomers in the feed, which, in a controlled polymerization, is a linear function of monomer conversion. CRP requires the following two conditions: the initiation should be sufficiently fast so that nearly all chains start to grow simultaneously; and little or no chain transfer occurs to increase the total number of chains. It is well known to those skilled in the art of polymers that when the polydispersity index of a polymer is broad, the polymer contains polymeric segments with substantial smaller and larger molecular weight segments than the number average molecular weight of the polymer. On the one hand, low molecular weight segments may have an adverse effect on physical properties of the polymer such as tensile strength, elongation and flexural modulus; while on the other hand, very large molecular weight segments may result in high melt viscosity of the polymer which may produce limitations in the processability of the polymer. Thus, there are distinct advantages when the final polymer has a well defined and narrow polydispersity index. This permits a more predictable polymer product from a property perspective and minimizes the aforementioned disadvantages.

The present invention provides for more predictable end group functionality, i.e. higher efficiency of the desired functionalized end groups may be achieved, with substantially less premature termination reactions which would otherwise result in undesired truncation of the polymer chain, lack of functional end groups and an unpredictable molecular weight of the final product. Reactive halo-functional end groups may undergo reinitiation and further polymerization to produce block copolymers, or may be further functionalized through nucleophilic substitution, elimination or end capping reactions. The present invention permits efficient and predictable end group functionality in the final polymer product.

It is desirable to have a narrow molecular weight distribution i.e. polydispersity index in the final polymer product. A narrow molecular weight distribution may be achieved from the controlled polymerization in accordance with the present invention, as the chain length, end group functionality, and consistency of the polymer is substantially constant. In achieving a narrow molecular weight distribution, several factors may be promoted. Some factors which contribute to a narrow molecular weight distribution include: (1) a rate of initiation, which is competitive with the rate of propagation (allowing the simultaneous growth of all the polymer chains); (2) the exchange between species of different reactivities being faster than propagation (ensuring that all the active chain termini are equally susceptible to reaction with monomer for a uniform growth); (3) low to no chain transfer or termination; (4) the rate of activation versus deactivation; and (5) a homogenous system where mixing is sufficiently fast (all active centers are introduced at the onset of the polymerization). A polymerization which meets these factors may have a polydispersity close to the theoretical value of the Poisson distribution 1+1/DP. For example, the polydispersity of the polymer products of the present methods is generally about 1.5 or less.

Another characteristic of the final product is long-lived polymer chains. This refers to all chains retaining their active centers after full consumption of the monomer. Thus, propagation resumes upon the introduction of an additional monomer. This factor enables the preparation of block copolymers by sequential monomer addition.

Some embodiments of the present invention provide a polymerization process for the control of the microstructure of polymers and copolymers. Some embodiments of the present invention relate to living radical polymerization of halogen-containing and acrylic monomers utilizing organohalide initiators and to the formation of polymers therefrom. The processes of the various embodiments provide final polymer products which have narrow molecular weight distributions, which are obtained by high and efficient conversion and rapid or ultrafast polymerization reactions. Thus, the final polymer products obtained through the present methods have predictable molecular weights, a low polydispersity index, and high functionalities.

The process of the present invention employs one or more acrylate monomers. As used herein, the term "acrylate monomer" includes both acrylates and methacrylate monomers. The acrylate monomer may be any desired acrylate monomer including, without limitation, such monomers as (meth) acrylic acid monomers such as (meth)acrylic acid, methyl (meth)acrylate, ethyl(meth)acrylate, n-propyl(meth)acrylate, isopropyl(meth)acrylate, n-butyl(meth)acrylate, isobutyl (meth)acrylate, tert-butyl(meth)acrylate, n-pentyl(meth) acrylate, n-hexyl(meth)acrylate, cyclohexyl(meth)acrylate, n-heptyl(meth)acrylate, n-octyl(meth)acrylate, 2-ethylhexyl (meth)acrylate, nonyl(meth)acrylate, decyl(meth)acrylate, dodecyl(meth)acrylate, phenyl(meth)acrylate, toluoyl(meth) acrylate, benzyl(meth)acrylate, 2-methoxyethyl(meth)acrylate, 3-methoxybutyl(meth)acrylate, 2-hydroxyethyl(meth) acrylate, 2-hydroxypropyl(meth)acrylate, stearyl(meth) acrylate, glycidyl(meth)acrylate, 2-aminoethyl(meth) acrylate, -(methacryloyloxypropyl)trimethoxysilane, (meth) acrylic acid-ethylene oxide adducts, trifluoromethylmethyl (meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth) acrylate, perfluoromethyl(meth)acrylate, diperfluoromethylmethyl(meth)acrylate, 2-perfluoromethyl-2-perfluoroethylethyl(meth)acrylate, 2-perfluorohexylethyl (meth)acrylate, 2-perfluorodecylethyl(meth)acrylate and 2-perfluorohexadecylethyl(meth)acrylate. Particularly desirable is n-butyl acrylate, methyl methacrylate, 2-ethylhexyl acrylate, methyl acrylate, tert-butyl acrylate, 2-hydroxyethyl acrylate, glycidyl methacrylate or a combination thereof. However, any (meth)acrylate or (meth)acrylates may be used in the present invention.

The process of the present invention employs one or more metal catalyst. As used herein the term "metal catalyst" means a metal-containing compound or complex that contributes to determining the position of the atom transfer equilibrium and dynamics of exchange between dormant and active species. Thus, the metal catalyst employed should preferably be a good electron donor. Suitable metal catalysts include, for example, Cu(0), $Cu_2S$, $Cu_2Te$, $Cu_2Se$, Mn, Ni, Pt, Fe, R, V, and combinations thereof. Similarly, other suitable metal catalysts, including, for example, Au, Ag, Hg, Rh, Co, Ir, Os, Re, Mn, Cr, Mo, W, Nb, Ta, Zn, and compounds including one or more of the foregoing. Preferable, the metal catalyst is Cu(0), $Cu_2S$, $Cu_2Te$, $Cu_2Se$, or a combination thereof.

The metal catalyst may be in one or more physical forms. For example, the metal catalyst may be a wire, mesh, screen, shavings, powder, tubing, pellet, crystals, or other solid form. The metal catalyst may be a copper wire, a copper mesh, a copper screen, a copper shaving, a copper powder, a copper gauze, a copper sinter, a copper filter, a copper sliver, a copper tubing, copper crystals, copper pellets, a coating of elemental copper on non-reactive materials, and combinations thereof. Preferably, the metal catalyst is a copper mesh treated with a hydrochloric acid aqueous solution.

The process of the present invention employs one or more amine ligand. As used herein, the term "amine ligand" means a nitrogen-containing ligand. Such amine ligands are thought to solubilize the metal catalyst so it is available in its higher oxidation state. Thus, the ligand may drive the polymerization reaction by promoting the mixing of the various components of the reaction mixture on a molecular level. The amine ligands may be any amine ligand, including without limitation, primary, secondary, and tertiary alkyl or aromatic amines, as well as polyamines which may be linear, branched, or dendritic polyamines and polyamides. Suitable amine ligands include, for example, may include tris(2-dimethylaminoethyl)amine (Me6-TREN), N,N,N,N,N-pentamethyldiethylenetriamine (PMDETA), tris(2-aminoethyl)amine (TREN), or a combination thereof.

The process of the present invention employs one or more halogenated initiator. As used herein, the term "halogenated initiator" includes halogen-containing compounds that initiate the free radical reaction and contribute to the number of growing polymer chains in the reaction vessel. For example, the initiator may include: diethyl meso-2,5-dibromoadipate; dimethyl 2,6-dibromoheptanedioate, ethylene glycol bis(2-bromopropionate); ethylene glycol mono-2-bromopropionate; trimethylolpropane tris(2-bromopropionate); pentaerythritol tetrakis (2-bromopropionate); 2,2-dichloacetophenone; methyl 2-bromopropionate; methyl 2-chloropropionate; N-chloro-2-pyrrolidinone; N-bromosuccinimide; polyethylene glycol bis(2-bromopropionate); polyethylene glycol mono(2-bromopropionate); 2-bromopropionitrile; dibromochloromethane; 2,2-dibromo-2-cyanoacetamide; α,α'-dibromo-ortho-xylene; α,α'-dibromo-meta-xylene; α,α'-dibromo-para-xylene; α,α'-dichloro-para-xylene; 2-bromopropionic acid; methyl trichloroacetate; para-toluenesulfonyl chloride; biphenyl-4, 4'-disulfonyl chloride; diphenylether-4,4'-disulfonylchloride; bromoform; iodoform carbon tetrachloride; and combinations thereof. In some embodiments, the initiator may be an alkyl, sulfonyl, or nitrogen halide. The nitrogen halide can be also halogenated nylon, peptide, or protein. Alternatively, a polymer containing active halide groups, for example, poly (vinyl)chloride), the chloromethyl group or polychrolomethylsytrene) of the polymers and copolymers can also be used as initiators. Preferably, the halogenated initiator is dimethyl 2,6-dibromoheptanedioate, diethyl meso-2,5-dibromoadipate, ethylene glycol bis(2-bromopropionate); 2,2-dichloacetophenone, trimethylolpropane tris(2-bromopropionate); methyl 2-bromopropionate, or a combination thereof.

The process of the present invention employs one or more solvent. As used herein, the term "solvent" means a compound to reduce viscosity of the reaction mixture, increase conversion of the ligand, and/or promote fast disproportionation of the catalyst in order to facilitate ultrafast polymerization. Further, the solvent is intended to be non-reactive in order to prevent chain transfer, side reactions, or poisoning of the catalyst. Desirable solvents of the present methods include, protic, or dipolar aprotic solvents. Some desired solvents include acetonitrile, water, alcohol, ordipolar aprotic solvents, ethylene carbonate, propylene carbonate, ionic liquids, or a mixture thereof. For example, such solvents may include: ethylene glycol, diethylene glycol, triethylene glycol, 2-(2-ethoxyethoxy)ethanol, tetraethylene glycol, glycerine, hydroxyethyl(meth)acrylate ("HEMA"), phenols, dimethylsulfoxide ("DMSO"), dimethylforamide ("DMF"), dimethylacetamide ("DMAc"), N-methyl-2-pyrrolidone ("NMP"), ionic liquids, ethylene carbonate, and propylene carbonate. Suitable alcohols include methanol, ethanol, propanol, isopropanol, butanol, and tert butanol. Desirably, the solvent or solvent blend chosen does not cause precipitation of the polymer product during the reaction. Desirably, the solvent is acetonitrile, dimethylformate, ethylene carbonate, methanol, ethanol, propylene carbonate, water, dimethylformamide, propionitrile, ethylene glycol, an ionic liquid, or a combination thereof.

The products of the inventive process may be used to provide curable resin compositions useful as adhesives, sealants, or coatings. The polymers of the methods also exhibit good oil resistance, heat resistance, adhesiveness and flexibility. Further, the products encompassed by the methods of the present invention can be widely used as pressure sensitive adhesive formulations, hot-melt adhesives, structural adhesives, sealants, and coatings and the like.

The processes of the present invention may employ and the compositions of the present invention may include additional components to provide one or more desired characteristics to the products of the processes or to the compositions. Suitable additional components include, for example, monomers (in addition to the acrylate monomers described above), polymers, plasticizers, thickening agents, rheology agents, coloring agents, pigments, fillers, additional initiators (other than those described above), and combinations thereof.

EXAMPLES

Comparative Example

One Pot Synthesis of Poly Methyl Acrylate with Dimethyl 2,6-Dibromoheptanedioate/Cu(0)/Pentamethyldiethylenetriamine in Acetonitrile 34 g of Acteonitrile, 0.670 g of dimethyl 2,6-dibromoheptanedioate, 0.0697 g of pentamethyldiethylenetriamine (PM-DETA), and 31.82 g of methyl acrylate were added to a 250-milliliter four-neck round-bottom flask with a mechanical stirrer, 2 condensers, and a rubber septum. The mixture was stirred and cooled to −78° C., and 53 g of copper mesh treated with 0.1 N hydrochloric acid was added to the mixture with continued stirring. The flask was then degassed using 6 freeze-pump-thaw cycles under a nitrogen environment. The reaction mixture was then warmed to 25° C., the polymerization reaction was continued for 4 hours, and stopped with the introduction of air.

A sample of the product was dissolved in deuterated chloroform (CDCl$_3$), and the conversion was measured by $^1$H-NMR spectroscopy. The conversion of methyl acrylate was 72% at 4 hours. A sample was dissolved in toluene and washed with sodium chloride aqueous solution three times. The sample in the toluene layer was dissolved in THF for GPC analysis. The number average molecular weight M$_n$ by GCP with PMMA standards was 15,508. The molecular weight distribution M$_w$/M$_n$ was very broad with a bimodal distribution.

Inventive Example 1

Synthesis of Poly Methyl Acrylate with Dimethyl 2,6-Dibromoheptanedioate/Cu(0)/Pentamethyldiethylenetriamine in Acetonitrile

Using the method of the invention, 32 g of acetonitrile, 0.0.62 g of dimethyl 2,6-dibromoheptanedioate, and 0.53 g of copper mesh treated with 0.1 N hydrochloric acid were added to a 250-milliliter four-neck round-bottom flask with a mechanical stirrer, 2 condensers, and a rubber septum. 0.17 g PMDETA and 32.42 g of methyl acrylate were added to a 50 milliliter Schlenk tube. Both mixtures were degassed by 6 freeze-pump-thaw cycles under a nitrogen environment. The methyl acrylate/PMDETA mixture was added drop-wise to the flask at 30° C. via a cannula under nitrogen over the course of 30 minutes. The polymerization reaction was continued for 4 hours and stopped with the introduction of air.

Samples were taken at different intervals throughout the polymerization reaction. The samples were dissolved in CDCl$_3$, and the conversion was measured by $^1$H-NMR spectroscopy. The conversion of methyl acrylate was 94% at 4 hours. A sample was dissolved in toluene and washed with sodium chloride aqueous solution three times. The sample in the toluene layer was dissolved in THF for GPC analysis. The number average molecular M$_n$ by GPC with PMMA standards was 14,410. The molecular weight distribution M$_w$/M$_n$ was 1.24. X-ray fluorescence (XRF) analyses of the sample revealed Br content per polymer chain was 6,624 parts per million.

Figure 1:
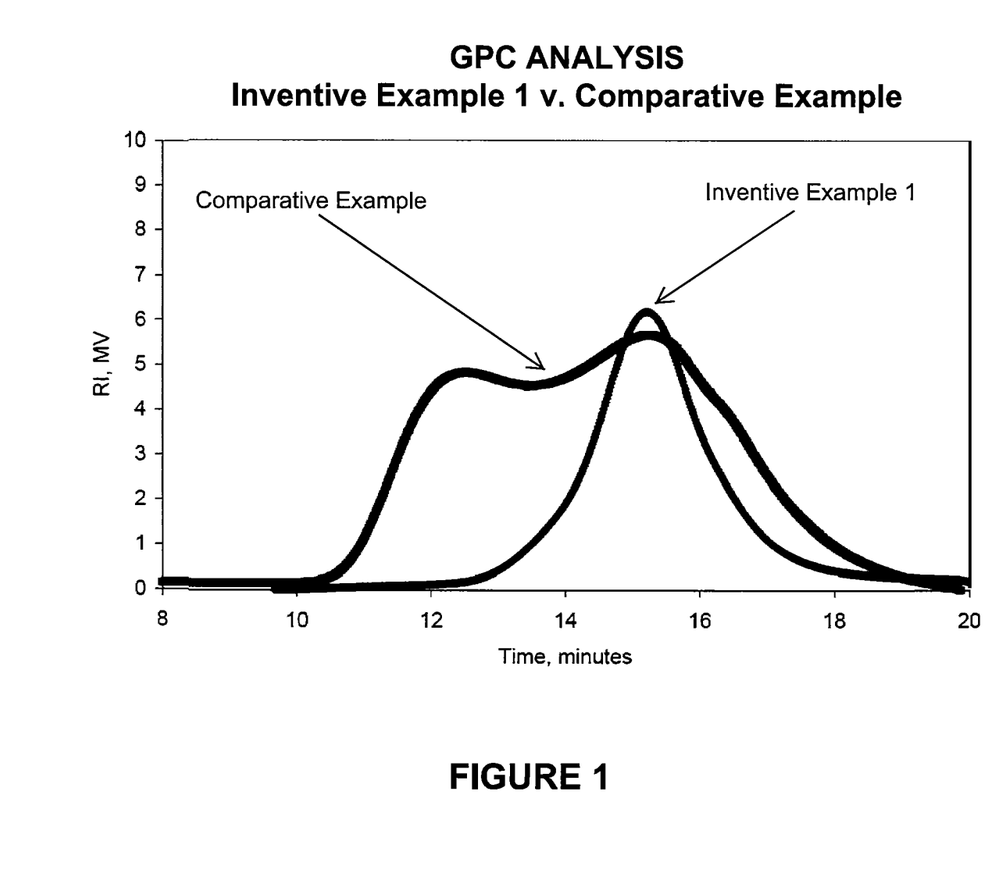
FIG. 1 is GPC trace for a polymer produced by the inventive portion-wise addition method compared to a comparative polymer produced by a standard SET-LRP/ATRP one-pot process.

In FIG. 1, the GPC trace for inventive polymer produced by the portion-wise addition method is compared to a comparative polymer standard produced by a conventional SET-LRP/ATRP one-pot process. The inventive polymer has a mono modal distribution that is close to the theoretical Mn value of 12,000 as determined by ratio of initial monomer/initiator and conversion (about 15.5 minutes; Mn about 14,000). In contrast, the comparative polymer has a bimodal distribution with a substantial high molecular weight fraction [(a) about 12.2 minutes; Mn about 347,000] in addition to the expected controlled polymer [(b) about 15.5 minutes; Mn about 14,000]. This high molecular weight fraction adversely affects the properties of the comparative material as discussed above.

Inventive Example 2

Synthesis of Poly Methyl Acrylate with Dimethyl 2,6-Dibromoheptanedioate/Cu(0)/Pentamethyldiethylenetriamine in Acetonitrile Using the method of the invention, 33 g of acetonitrile, 0.3547 g of dimethyl 2,6-dibromoheptanedioate, and 0.31 g of copper mesh treated with 0.1 N hydrochloric acid were added to a 250-milliliter four-neck round-bottom flask with a mechanical stirrer, 2 condensers, and a rubber septum. 0.0486 g PMDETA and 31.87 g of methyl acrylate were added to a 50 milliliter Schlenk tube. Both mixtures were degassed by 6 freeze-pump-thaw cycles under a nitrogen environment. The methyl acrylate/PMDETA mixture was added drop-wise to the flask at 40° C. via a cannula under nitrogen over the course of 50 minutes. The polymerization reaction was continued for 5 hours and stopped with the introduction of air.

Samples were taken at different intervals throughout the polymerization reaction. The samples were dissolved in $CDCl_3$, and the conversion was measured by $^1$H-NMR spectroscopy. The conversion of methyl acrylate was 74% at 5 hours. A sample was dissolved in toluene and washed with sodium chloride aqueous solution three times. The sample in the toluene layer was dissolved in THF for GPC analysis. The number average molecular $M_n$ by GPC with PMMA standards was 23,835. The molecular weight distribution $M_w/M_n$ was 1.24. X-ray fluorescence (XRF) analyses of the sample revealed Br content per polymer chain was 6,624 parts per million.

Inventive Example

Synthesis of Poly Methyl Acrylate with 2,2-Dichlorophenone/Cu(0)/Pentamethyldiethylenetriamine in Dimethyl Sulfoxide

Using the method of the invention, 45.8 g of dimethyl sulfoxide (DMSO), 0.330 g of 2,2-dichloroacetophenone (DCAP), and 1.30 g of copper mesh treated with 0.1 N hydrochloric acid were added to a 250-milliliter four-neck round-bottom flask with a mechanical stirrer, 2 condensers, and a rubber septum. 0.1450 g PMDETA and 34.92 g of methyl acrylate were added to a 50 milliliter Schlenk tube. Both mixtures were degassed by 6 freeze-pump-thaw cycles under a nitrogen environment. The methyl acrylate/PMDETA mixture was added drop-wise to the flask at 30° C. via a cannula under nitrogen over the course of 50 minutes. The polymerization reaction was continued for 4 hours and stopped with the introduction of air.

Samples were taken at different intervals throughout the polymerization reaction. The samples were dissolved in $CDCl_3$, and the conversion was measured by $^1$H-NMR spectroscopy. The conversion of methyl acrylate was 88% at 4 hours. A sample was dissolved in toluene and washed with sodium chloride aqueous solution three times. The sample in the toluene layer was dissolved in THF for GPC analysis. The number average molecular $M_n$ by GPC with PMMA standards was 11,997. The molecular weight distribution $M_w/M_n$ was 1.28.

Inventive Example 4

Synthesis of Poly Methyl Acrylate with PhCHBr$_2$/Cu(0)/Pentamethyldiethylenetriamine in Acetonitrile Using the method of the invention, 34.05 g of acetonitrile, 0.530 g of a,a-dibromotoluene, and 1.03 g of copper mesh treated with 0.1 N hydrochloric acid were added to a 250-milliliter four-neck round-bottom flask with a mechanical stirrer, 2 condensers, and a rubber septum. 0.0798 g PMDETA and 31.41 g of methyl acrylate were added to a 50 milliliter Schlenk tube. Both mixtures were degassed by 6 freeze-pump-thaw cycles under a nitrogen environment. The methyl acrylate/PMDETA mixture was added drop-wise to the flask at 45° C. via a cannula under nitrogen over the course of 30 minutes. The polymerization reaction was continued for 4 hours and stopped with the introduction of air.

Samples were taken at different intervals throughout the polymerization reaction. The samples were dissolved in CDCl$_3$, and the conversion was measured by $^1$H-NMR spectroscopy. The conversion of methyl acrylate was 79% at 4 hours. A sample was dissolved in toluene and washed with sodium chloride aqueous solution three times. The sample in the toluene layer was dissolved in THF for GPC analysis. The number average molecular $M_n$ by GPC with PMMA standards was 15,459. The molecular weight distribution $M_w/M_n$ was 1.10.

Inventive Example 5

Synthesis of Poly 2-Ethylhexyl Acrylate with PhCHBr$_2$/Cu(0)/Pentamethyldiethylenetriamine in Acetonitrile PhCHBr$_2$

2-EHA

Using the method of the invention, 37.60 g of acetonitrile, 1.2491 g of a,a-dibromotoluene, and 0.56 g of copper mesh treated with 0.1 N hydrochloric acid were added to a 250-milliliter four-neck round-bottom flask with a mechanical stirrer, 2 condensers, and a rubber septum. 0.0770 g PMDETA and 37.60 g of 2-ethylhexyl acrylate were added to a 50 milliliter Schlenk tube. Both mixtures were degassed by 6 freeze-pump-thaw cycles under a nitrogen environment. The 2-ethylhexyl acrylate/PMDETA mixture was added drop-wise to the flask at 45° C. via a cannula under nitrogen over the course of 60 minutes. The polymerization reaction was continued for 3.5 hours and stopped with the introduction of air.

Samples were taken at different intervals throughout the polymerization reaction. The samples were dissolved in CDCl$_3$, and the conversion was measured by $^1$H-NMR spectroscopy. The conversion of 2-ethylhexyl acrylate was 54% at 4 hours. A sample was dissolved in toluene and washed with sodium chloride aqueous solution three times. The sample in the toluene layer was dissolved in THF for GPC analysis. The number average molecular $M_n$ by GPC with PMMA standards was 6,226. The molecular weight distribution $M_w/M_n$ was 1.27.

Inventive Example 6

Synthesis of Terpolymer of 2-Ethylhexyl Acrylate, Methyl Acrylate and Tert-Butyl Acrylate with Dimethyl 2,6-Dibromoheptanedioate/Cu(0)/Pentamethyldiethylenetriamine in Acetonitrile Using the method of the invention, 104.8 g of acetonitrile, 0.69 g of dimethyl 2,6-dibromoheptanedioate, and 0.55 g of copper mesh treated with 0.1 N hydrochloric acid aqueous solution were added to a 250-milliliter four-neck round-bottom flask, with a mechanical stirrer, a condenser and a rubber septum. 0.0748 g of PMDETA, 32.20 g of 2-ethylhexyl acrylate, 28.12 g of methyl acrylate, and 10.19 g tert-butyl acrylate were added to a 100 ml Schlenk tube. Both mixtures were degassed by six freeze-pump-thaw cycles under nitrogen. The monomers/PMDETA mixture of was added drop-wise to the flask via cannula at 60° C. under nitrogen over 90 minutes. The polymerization reaction was continued for 20 hours and quenched with air. Conversion of acrylate monomers was measured by $^1$H-NMR spectroscopy and found to be 90% after 20 hours. The number average molecular $M_n$ by GPC with PMMA standards was 38,600, the molecular weight distribution $M_w/M_n$ was 1.41.

Inventive Example

Synthesis of Terpolymer of 2-Ethylhexyl Acrylate, Methyl Acrylate and Tert-Butyl Acrylate with Dimethyl 2,6-Dibromoheptanedioate/Cu(0)/Copper(II) Bromide/Pentamethyldiethylenetriamine in Acetonitrile and Ethyl Acetate Using the method of the invention, 39.8 g of acetonitrile, 29.27 g of ethyl acetate, 0.1048 g of dimethyl 2,6-dibromoheptanedioate, and 0.64 g of copper mesh treated with 0.1 N hydrochloric acid aqueous solution were added to a 250-milliliter four-neck round-bottom flask, with a mechanical stirrer, a condenser and a rubber septum. 0.0126 g of copper (II) bromide, 15.6 g of acetonitrile, 0.0524 g of PMDETA, 25.37 g of 2-ethylhexyl acrylate, 12.98 g of methyl acrylate, and 3.46 g of tert-butyl acrylate were added to a 100 ml Schlenk tube. Both mixtures were degassed by six freeze-pump-thaw cycles under nitrogen. The monomers/PMDETA mixture of was added drop-wise to the flask via cannula at 60° C. under nitrogen over 90 minutes. The polymerization reaction was continued for 20 hours and quenched with air. Conversion of acrylate monomers was measured by $^1$H-NMR spectroscopy and found to be 90% after 20 hours. The number average molecular $M_n$ by GPC with PMMA standards was 38,600, the molecular weight distribution $M_w/M_n$ was 1.41.

Inventive Example 8

Synthesis of Poly (n-Butyl Acrylate) with Dimethyl 2,6-Dibromoheptanedioate/Cu(0)/Pentamethyldiethylenetriamine in Acetonitrile Using the method of the invention, 58.32 g of acetonitrile, 1.413 of g dimethyl 2,6-dibromoheptanedioate, and 0.41 g of copper mesh treated with 0.1 N hydrochloric acid aqueous solution were added to a 250-milliliter four-neck round-bottom flask, with a mechanical stirrer, a condenser and a rubber septum. 0.0752 g of PMDETA and 36.14 g of n-butyl acrylate were added to a 50 ml Schlenk tube. Both mixtures were degassed by six freeze-pump-thaw cycles under nitrogen. The monomer/PMDETA mixture of was added drop-wise to the flask via cannula at 70° C. under nitrogen over 40 minutes. The polymerization reaction was continued for 3.5 hours and quenched with air. Samples were taken at intervals throughout the reaction. Conversion of monomers was measured by $^1$H-NMR spectroscopy and found to be 69% after 3.5 hours. The number average molecular $M_n$ by GPC with PMMA standards was 78,100, the molecular weight distribution $M_w/M_n$ was 1.72.

Inventive Example 9

Synthesis of Methyl Acrylate/n-Butyl Acrylate Copolymer with Mewthyl 2-Bromo Proprionate/Cu(0)/Pentamethyldiethylenetriamine in Acetonitrile Using the method of the invention, 75.05 g of acetonitrile, 0.3375 g of methyl 2-bromo propionate, and 0.43 g of copper mesh treated with 0.1 N hydrochloric acid were added to a 250-milliliter four-neck round-bottom flask with a mechanical stirrer, 2 condensers, and a rubber septum. 0.0381 g PMDETA and 20.84 g of methyl acrylate were added to a first 50 milliliter Schlenk tube. 0.0774 g PMDETA and 51.21 g of n-butyl acrylate were added to a second 50 milliliter Schlenk tube. All 3 mixtures were degassed by 6 freeze-pump-thaw cycles under a nitrogen environment.

The methyl acrylate/PMDETA mixture was added drop-wise to the flask at 70° C. via a cannula under nitrogen over the course of 35 minutes. The polymerization reaction was continued for 2.5 hours. Samples were taken at different intervals throughout the polymerization reaction. The samples were dissolved in CDCl$_3$, and the conversion was measured by $^1$H-NMR spectroscopy. The conversion of methyl acrylate was 62% at 2.5 hours.

The n-butyl acrylate/PMDETA mixture was then added drop-wise to the flask at 70° C. via a cannula under nitrogen over the course of 60 minutes. The polymerization reaction was continued for 5 hours at 70° C. and then for 22 hours at room temperature. Samples were taken at different intervals throughout the polymerization reaction. The samples were dissolved in CDCl$_3$, and the conversion was measured by $^1$H-NMR spectroscopy. The conversion of methyl acrylate was 94% and the conversion of n-butyl acrylate was 74%.

An additional 0.1183 g of PMDETA was added to the flask via air tight syringe and the polymerization was continued for an additional 28 hours. The final conversion of methyl acrylate was 98% and n-butyl acrylate was 89%.

The number average molecular $M_n$ at 2.5 hours by GPC with PMMA standards was 9,389 and the molecular weight distribution $M_w/M_n$ was 1.53. The number average molecular $M_n$ at 48 hours by GPC with PMMA standards was 41,790 and the molecular weight distribution $M_w/M_n$ was 1.19.

Figure 2:
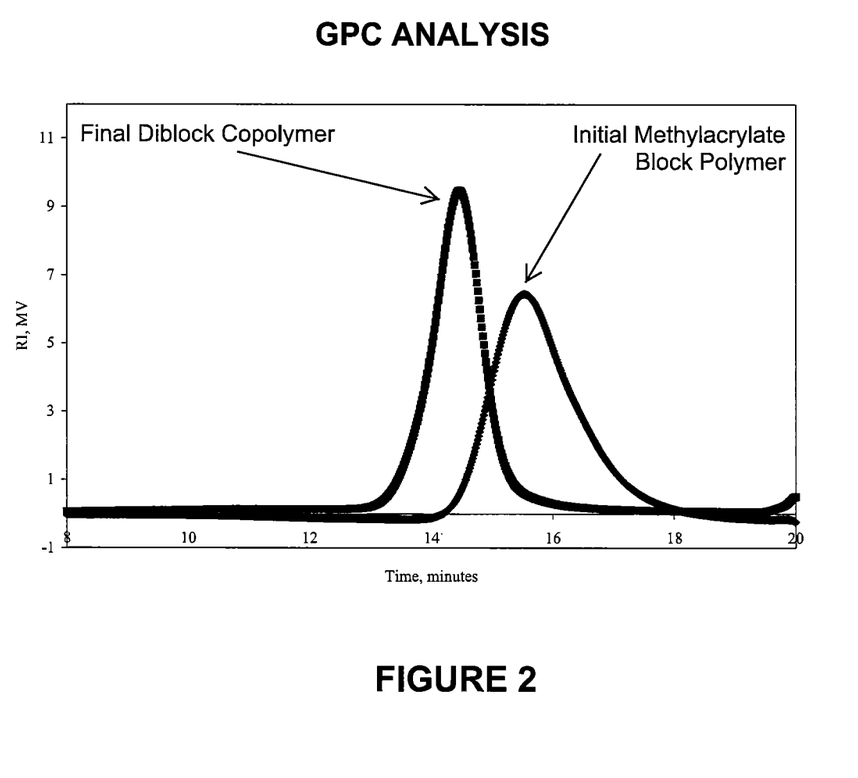
FIG. 2 is a GPC trace showing the molecular weights of an initial methacrylate block and a final diblock copolymer after growth of the second mixed butyl and methacrylates block onto the initial poly(methacrylate) segment produced by the inventive method.

FIG. 2 is a GPC trace showing the molecular weights of the initial methacrylate block and the final diblock copolymer after growth of the second mixed butyl and methacrylates block onto the initial poly(methacrylate) segment. Both blocks were prepared by the inventive method, i.e., slow portion-wise addition of monomer(s)/ligand solutions. The initial polymer has Mn value about 9,400 which is close to the theoretical value of about 6,600 as determined from product of [M]$_0$/[I] and conversion and relatively low PDI (1.53). The GPC analysis clearly shows that all of the initial polymer is consumed as macroinitiator of the second block and none of the original material remains after the second addition. The molecular weight of the final diblock copolymer has a Mn value of about 41,800, close to the theoretical value of about 32,900 and a low polydispersity (1.19). This demonstrates that all of the initial polymer chain ends are active and that the inventive process proceeds with a high degree of control.

Figure 3:
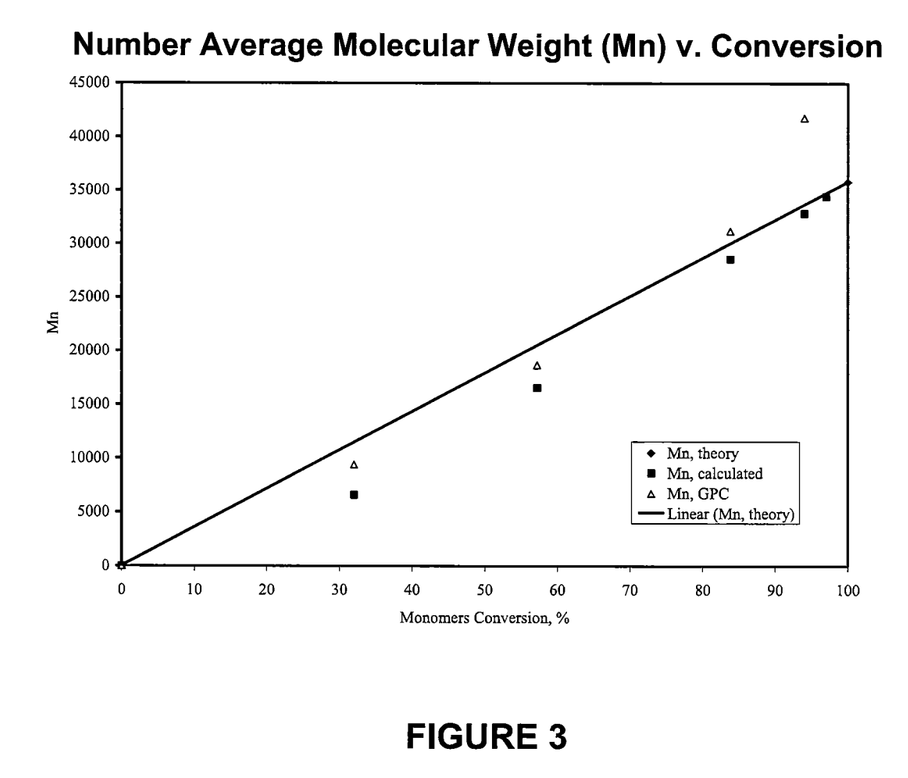
FIG. 3 shows Mn versus conversion in a controlled radical polymerization.

Mn versus conversion (FIG. 3) shows a controlled radical polymerization requires that number average molecular weight (Mn) increases linearly as a function of conversion. In this experiment, samples prepared by the inventive process were removed periodically and analyzed by GPC and 1H-NMR spectroscopy to determine the molecular weight and conversion respectively. The data shows the total conversion of monomers as a function of molecular weight (experimentally determined from GPC and calculated from NMR) and clearly show that molecular weight increases in a linear manner with conversion. The theoretical molecular weight expected from the corresponding conversion is also shown. The experimentally generated data is close to that expected from theory for all samples tested.

Inventive Example 10

Synthesis of a Terpolymer of n-Butyl Acrylate, Ethyl Acrylate, and Methoxyethyl Acrylate with PhCHBr$_2$/Cu(0)/Pentamethyldiethylenetriamine in Acetonitrile Dimethyl 2,6-dibromoheptanedioate (DMDBrHD)

Di Br Terpolymer

Using the method of the invention, 64.03 g of acetonitrile, 0.6942 g of a,a-dibromotoluene, and 0.81 g of copper mesh treated with 0.1 N hydrochloric acid were added to a 250-milliliter four-neck round-bottom flask with a mechanical stirrer, 2 condensers, and a rubber septum. 0.0733 g PMDETA, 50.33 g of n-butyl acrylate, 10.71 g of ethyl acrylate, and 3.3461 g of 2-methuxy acrylate were added to a 100 milliliter Schlenk tube. Both mixtures were degassed by 6 freeze-pump-thaw cycles under a nitrogen environment. The monomers/PMDETA mixture was added drop-wise to the flask at 65° C. via a cannula under nitrogen over the course of 85 minutes. The polymerization reaction was continued for 4 hours at 65° C. and then for 20 hours at room temperature. The polymerization was stopped with the introduction of air.

Samples were taken at different intervals throughout the polymerization reaction. The samples were dissolved in CDCl$_3$, and the conversion was measured by $^1$H-NMR spectroscopy. The conversion of the monomers was 96% at 20 hours. A sample was dissolved in toluene and washed with sodium chloride aqueous solution three times. The sample in the toluene layer was dissolved in THF for GPC analysis. The number average molecular $M_n$ by GPC with PMMA standards was 34,610. The molecular weight distribution $M_w/M_n$ was 1.28. X-ray fluorescence (XRF) analyses of the sample revealed that the bromine content of the polymer chain was 4,934 ppm.

Inventive Example 11

Synthesis of a Terpolymer of n-Butyl Acrylate, Ethyl Acrylate, and Methoxyethyl Acrylate with Dimethyl 2,6-Dibromoheptanedioate/Cu(0)/Pentamethyldiethylenetriamine in Acetonitrile Using the method of the invention, 64.95 g of acetonitrile, 0.6935 g of dimethyl 2,6-dibromoheptanedioate, and 0.68 g of copper mesh treated with 0.1 N hydrochloric acid were added to a 250-milliliter four-neck round-bottom flask with a mechanical stirrer, 2 condensers, and a rubber septum. 0.0114 g of copper (II) bromide, 6.03 g of acetonitrile, 0.0524 g PMDETA, 49.45 g of n-butyl acrylate, 11.08 g of ethyl acrylate, and 6.10 g of 2-methuxy acrylate were added to a 100 milliliter Schlenk tube. Both mixtures were degassed by 6 freeze-pump-thaw cycles under a nitrogen environment. The monomers/PMDETA mixture was added drop-wise to the flask at 60° C. via a cannula under nitrogen over the course of 90 minutes. The polymerization reaction was continued for 4 hours at 60° C. and then for 68 hours at room temperature. The polymerization was stopped with the introduction of air.

Samples were taken at different intervals throughout the polymerization reaction. The samples were dissolved in CDCl$_3$, and the conversion was measured by $^1$H-NMR spectroscopy. The conversion of the monomers was 95% at 68 hours. A sample was dissolved in toluene and washed with sodium chloride aqueous solution three times. The sample in the toluene layer was dissolved in THF for GPC analysis. The number average molecular $M_n$ by GPC with PMMA standards was 36,046. The molecular weight distribution $M_w/M_n$ was 1.21. X-ray fluorescence (XRF) analyses of the sample revealed that the bromine content of the polymer chain was 45,020 ppm.

Inventive Example 12

Synthesis of Poly (n-Butyl Acrylate) with Dimethyl 2,6-Dibromoheptanedioate/Cu(0)/Copper(II) Bromide/Pentamethyldiethylenetriamine in Acetonitrile Using the method of the invention, 1081.29 g of acetonitrile and 4.96 g of dimethyl 2,6-dibromoheptanedioate were added to a 2-L reactor with a catalyst chamber, a pump, a mechanical stirrer, a condenser and a rubber septum. 0.0296 g of Copper (II) bromide, 70.00 g of acetonitrile, and 0.83 g of PMDETA, and of 462.97 g n-butyl acrylate were added to a 1000 ml Schlenk flask. Both the 2-L reactor and the 1000 ml Schlenk flask were degassed by six freeze-pump-thaw cycles under nitrogen. The stirred mixture of acetonitrile and dimethyl 2,6-dibromoheptanedioate was then pumped at the rate about 300 ml/min through the external catalyst chamber containing 2.30 g treated copper (0) mesh. The mixture with n-butyl acrylate, Cu(II)Br$_2$, acetonitrile, and PMDETA was added drop-wise via a cannula needle to the reactor at 65° C. via a cannula needle under nitrogen over 90 minutes. The polymerization reaction was continued 15 hrs at 65° C. and quenched with air. Samples were taken at different intervals throughout the reaction. The conversion of monomers was 85% at 15 hrs reaction time. The number average molecular $M_n$ by GPC with PMMA standards was 35,100, the molecular weight distribution $M_w/M_n$ was 1.34.

Inventive Example 13

Synthesis of Terpolymer of 2-Ethylhexyl Acrylate, Methyl Acrylate and 2-Hydroxylethyl Acrylate with Dimethyl 2,6-Dibromoheptanedioate/Cu(0)/Pentamethyldiethylenetriamine in Acetonitrile and Ethyl Acetate Using the method of the invention, 200.14 g of acetonitrile, 124.22 g of ethyl acetate, 0.6225 g of dimethyl 2,6-dibromoheptanedioate, and 0.75 g of copper mesh treated with 0.1 N hydrochloric acid were added to a 1 liter four-neck round-bottom flask, with a mechanical stirrer, a condenser and a rubber septum. 0.0830 g of copper(II) bromide, 52.52 g of acetonitrile, 0.2557 g of PMDETA, 147.15 g of 2-ethylhexyl acrylate, 47.25 g of methyl acrylate, and 10.90 g of 2-hydroxylethyl acrylate were added to a 500 ml Schlenk flask. The 1 liter reactor was purged continuously with nitrogen while the 500 ml Schlenk flask was degassed by six freeze-pump-thaw cycles under nitrogen. The monomers/PMDETA mixture of was added drop-wise to the 1 liter reactor via cannula at 50° C. under nitrogen over 70 minutes. The polymerization reaction was continued for 22 hours and quenched with air. Conversion of acrylate monomers was measured by $^1$H-NMR spectroscopy and found to be 80% after 22 hours.

The number average molecular $M_n$ by GPC with PMMA standards was 82,400, the molecular weight distribution $M_w/M_n$ was 1.33.

Inventive Example 14

Synthesis of Terpolymer of n-Butyl Acrylate, Methyl Acrylate and Tert-Butyl Acrylate Acrylate with Dimethyl 2,6-Dibromoheptanedioate/Cu(0)/Pentamethyldiethylenetriamine in Acetonitrile and Ethyl Acetate Using the method of the invention, 157.54 g of acetonitrile, 119.80 g of ethyl acetate, 0.2084 g of dimethyl 2,6-dibromoheptanedioate, and 1.55 g of copper mesh treated with 0.1 N hydrochloric acid were added to a 1 liter four-neck round-bottom flask, with a mechanical stirrer, a condenser and a rubber septum. 0.0801 g of copper(II) bromide, 50.00 g of acetonitrile, 0.6226 g of PMDETA, 185.43 g of n-butyl acrylate, 16.46 g of methyl acrylate, and 23.99 g of tert-butyl acrylate were added to a 500 ml Schlenk flask. The 1 liter reactor was purged continuously with nitrogen while the 500 ml Schlenk flask was degassed by six freeze-pump-thaw cycles under nitrogen. The monomers/PMDETA mixture of was added drop-wise to the 1 liter reactor via cannula at 50° C. under nitrogen over 60 minutes. The polymerization reaction was continued for 21 hours and quenched with air. Conversion of acrylate monomers was measured by $^1$H-NMR spectroscopy and found to be 70% after 21 hours. The number average molecular $M_n$ by GPC with PMMA standards was 266,000, the molecular weight distribution $M_w/M_n$ was 1.70.

What is claimed is:

1. A controlled radical polymerization process comprising the steps of:
   (i) providing a mixture comprising:
      (a) one or more (meth)acrylate monomers; and
      (b) at least one amine ligand;
   (ii) feeding said mixture portion-wise at a defined flow-rate into a reaction vessel containing: a solvent; at least one halogenated initiator; and a metal catalyst,
   (iii) continuing to feed said mixture portion-wise into said vessel to cause a polymerization of said monomer, and
   (iv) permitting said reaction to proceed.
2. The process of claim 1, wherein the solvent is selected from the group consisting of acetonitrile, dimethylformate, ethylene carbonate, methanol, ethanol, propylene carbonate, water, dimethylformamide, propionitrile, ethylene glycol, ionic liquids, and combinations thereof.
3. The process of claim 1, wherein said feeding is conducted continuously.
4. The process of claim 1, wherein said feeding is conducted intermittently.
5. The process of claim 1, wherein the polymer reaction product from the process has a polydispersity of about 1.0 to about 1.8.
6. The process of claim 1, wherein the polymer reaction product from the process has a polydispersity of about 1.8 or less.
7. The process of claim 1, wherein the polymer reaction product from the process has a polydispersity of about 1.0 to about 1.3.
8. The process of claim 1, wherein said process is conducted until at least 80% of monomer is converted to polymer.
9. The process of claim 1, wherein said process is conducted until at least 90% of monomer is converted to polymer.
10. The process of claim 1, wherein said process is performed at a temperature of about 0° C. to about 80° C.
11. The process of claim 1, wherein said process is performed at a temperature of about 23° C. to about 70° C.
12. The process of claim 1, wherein said process is performed at a temperature of about 40° C. to about 60° C.
13. The process of claim 1, wherein said process is performed for a period of about 0.5 hours to about 69 hours.
14. The process of claim 1, wherein said (meth)acrylate is selected from the group consisting of methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, 3-(methacryloyloxypropyl)trimethoxysilane, (meth)acrylic acid-ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylethyl (meth)acrylate, 2-perfluorohexylethyl (meth)acrylate, 2-perfluorodecylethyl(meth)acrylate, 2-perfluorohexadecylethyl (meth)acrylate, and combinations thereof.
15. The process of claim 1, wherein said (meth)acrylate is selected from the group consisting of n-butyl acrylate, methyl methacrylate, 2-ethylhexyl acrylate, methyl acrylate, tert-butyl acrylate, 2-hydroxyethyl acrylate, glycidyl methacrylate and combinations thereof.
16. The process of claim 1, wherein said initiator is selected from the group consisting of mono-halogenated compounds, poly-halogenated compounds, and combinations thereof.
17. The process of claim 1, wherein the initiator is selected from the group consisting of dimethyl 2,6-dibromoheptanedioate, diethyl meso-2,5-dibromoadipate, ethylene glycol bis(2-bromopropionate)-1-, 2,2-dichloacetophenone, trimethylolpropane tris(2-bromopropionate), methyl 2-bromopropionate, and combinations thereof.
18. The process of claim 1, wherein the ligand is selected from the group consisting of tris(2-dimethylaminoethyl)amine (Me6-TREN), N,N,N,N,N-pentamethyldiethylenetriamine (PMDETA), tris(2-aminoethyl)amine (TREN), and combinations thereof.
19. The process of claim 1, wherein the metal catalyst is selected from the group consisting of Cu(0), $Cu_2O$, $Cu_2S$, $Cu_2Se$, $Cu_2Te$, and combinations thereof.
20. The process of claim 1, wherein the process is performed at SET-LRP conditions.
21. The process of claim 1, wherein the process is performed at ATRP conditions.

* * * * *